Inventor.
Glover E. Ruckstell.

Patented Feb. 16, 1926.

1,573,359

UNITED STATES PATENT OFFICE.

GLOVER E. RUCKSTELL, OF BERKELEY, CALIFORNIA.

POWER-TRANSMISSION DEVICE.

Application filed September 9, 1924. Serial No. 736,752.

*To all whom it may concern:*

Be it known that I, GLOVER E. RUCKSTELL, a citizen of the United States, residing at Berkeley, county of Alameda, and State of California, have invented new and useful Improvements in Power-Transmission Devices, of which the following is a specification.

This invention relates to power transmission devices and particularly to a power take-off mechanism adapted to be conveniently operated directly from the engine of a motor vehicle. Many devices for performing this function have heretofore been devised but all of such mechanisms, as far as I am aware, have been complicated, expensive, inconvenient and inefficient. It is the object of this invention to provide an improved mechanism of this type which is simple in construction and convenient and efficient in operation.

With the above and other objects in view, my invention consists in the features of construction and operation set forth in the following specification and illustrated in the accompanying drawing. In such drawing annexed hereto and forming a part of this specification I have shown certain specific embodiments of my invention, but it will be understood that the invention can be otherwise embodied and that the drawing is not to be construed as defining or limiting the scope of the invention, the claims appended to this specification being relied upon for that purpose.

Referring to the figures of the drawing.

Figure 1:
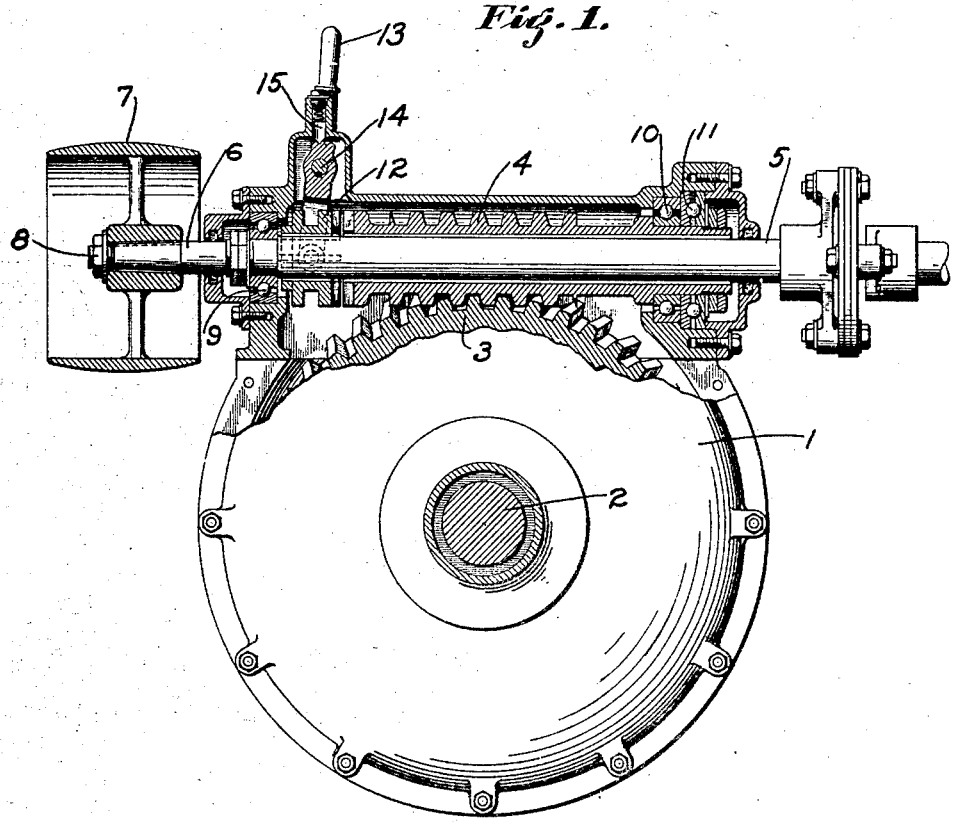
Fig. 1 is a side elevation of my improved device through the rear axle of a motor vehicle, the driving shaft housing being shown in section.

Referring more specifically to the drawing by reference characters, 1 indicates the differential housing of the rear axle of a motor vehicle and 2 one of the axle shafts. The axle shafts are driven from a worm gear 3 through the usual differential mechanism (not illustrated). The worm gear 3 is driven by a worm 4 mounted on the usual motor-operated driving shaft 5.

The object of the invention is to use the motor of the vehicle for power transmitting purposes other than that of running the vehicle. For this purpose, as illustrated in Fig. 1 of the drawing, I extend the driving shaft 5 rearwardly at 6 and mount a pulley 7 thereon. A nut 8 holds the pulley on the shaft and provides means for readily removing the pulley when not in use. The free end of the shaft is supported in a bearing 9 of the housing 1.

It will be understood that when the shaft 5 is being used for transmitting power through the pulley 7 the axle shafts 2 should be disengaged therefrom. Various means for providing such a neutral or non-driving relation of these parts can be provided. The following described mechanism has been illustrated in the drawing for performing this function.

The worm 4 is mounted loosely on the shaft 5 and the forward end thereof is supported in a side bearing 10 and a thrust bearing 11 in the housing 1. It will be noted that the bearing 11 is such as to take the axial thrust of the worm in both directions. A clutch 12 is splined to the shaft 5 between the bearing 9 and the worm. The adjacent ends of the clutch and worm are provided with cooperating clutch teeth. The clutch can be shifted to its engaged and disengaged positions by means of a hand lever 13 pivoted at 14. A spring-pressed detent 15 serves to hold the clutch in either of these positions.

The operation of the device is believed to be obvious. When operating the vehicle in the usual manner, the cluth 12 will be engaged with the worm, whereupon the worm and worm wheel will be driven from the shaft 5. The pulley 7 will preferably, though not necessarily, be removed. When desiring to use the engine for other power transmitting purposes, the pulley will be mounted on the extended portion 6 of the drive shaft and the clutch will be thrown to the disengaged position. In this position of the clutch the worm and worm wheel will not be driven and the pulley 7 can be used to transmit power to any mechanism desired.

It should be particularly noted that in my power transmitting mechanism the power is taken directly from the main driving shaft of the vehicle. Such construction not only simplifies the running operation and provides a direct drive from the engine but also eliminates any wear of the parts not operated. The only operating mechanism between the shaft 5 and the engine of the vehicle is the change speed mechanism, and such mechanism can be used in connection with the power take-off drive to vary the speed of such drive in the same manner as in connection with the running of the vehicle.

Figure 2:
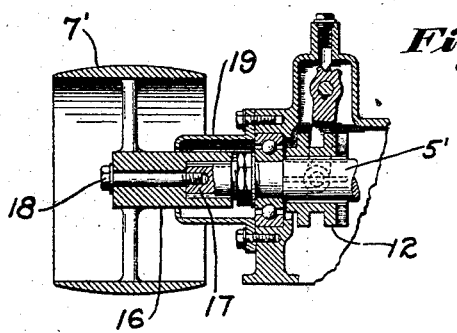
Fig. 2 is a fragmentary view of a modification thereof.

In Fig. 2 I have shown a modified form of my invention. In this construction the pulley 7' is provided with an extended hub 16 adapted to engage over a projecting end 17 of the driving shaft 5'. A bolt 18 is provided for holding the pulley on the shaft. A housing 19 is also preferably provided around the said projecting end 17. This pulley can be very easily detached and when so detached only the housing 19 is left projecting rearwardly of the housing 1.

While in the drawing I have illustrated the power transmitting means as being a pulley 7 and 7', it will be understood that any power transmitting element can be connected to the projecting end of the driving shaft and that all the various parts of the mechanism can be modified as desired within the scope of the appended claims without departing from the spirit of my invention.

Having thus described my invention, what I claim and desire to secure by Letters Patent is:

1. A power transmitting device comprising the combination of a worm gear operatively connected to the rear axle shafts of a motor operated vehicle, a housing therefor, a driving shaft driven from the vehicle motor and extending rearwardly of the vehicle and through the housing, a worm loose on the shaft in the housing and in mesh with the worm gear, power take-off means on the driving shaft rearwardly of the worm outside the housing, clutch means within the housing providing a disengageable connection between the worm and the driving shaft, and means extending outwardly of the housing for shifting the clutch means.

2. A power transmitting device comprising the combination of a worm gear operatively connected to the rear axle shafts of a motor operated vehicle, a housing therefor, a driving shaft driven from the motor vehicle and extending rearwardly of the vehicle and through and rearwardly of the housing, bearings at each side of the housing rotatably supporting the shaft, a worm loose on the shaft in the housing and in mesh with the worm gear, an axially shiftable clutch splined to the shaft at one end of the worm within the housing, the worm and clutch being between the shaft supporting bearings and the adjacent ends of the worm and clutch being toothed, and means extending outwardly of the housing for shifting the clutch.

GLOVER E. RUCKSTELL.